US006959350B1

(12) United States Patent
Luke et al.

(10) Patent No.: US 6,959,350 B1
(45) Date of Patent: *Oct. 25, 2005

(54) CONFIGURABLE USB INTERFACE WITH VIRTUAL REGISTER ARCHITECTURE

(75) Inventors: David Luke, Boise, ID (US); Dave Gilbert, Boise, ID (US)

(73) Assignee: Cypress Semiconductor Corp., San Jose, CA (US)

( * ) Notice: Subject to any disclaimer, the term of this patent is extended or adjusted under 35 U.S.C. 154(b) by 410 days.

This patent is subject to a terminal disclaimer.

(21) Appl. No.: 10/186,465

(22) Filed: Jun. 28, 2002

(51) Int. Cl.[7] .............................................. G06F 13/00
(52) U.S. Cl. ...................... 710/104; 710/305; 710/107; 710/110
(58) Field of Search ................ 710/8–11, 104, 710/305, 107, 110

(56) References Cited

U.S. PATENT DOCUMENTS

| 6,122,676 | A | * | 9/2000 | Brief et al. | 710/9 |
| 6,742,055 | B2 | * | 5/2004 | Matsunaga | 710/10 |
| 6,745,264 | B1 | * | 6/2004 | Luke et al. | 710/52 |
| 6,782,503 | B1 | * | 8/2004 | Dawson | 714/739 |
| 6,795,872 | B2 | * | 9/2004 | Page et al. | 710/8 |
| 2002/0188701 | A1 | * | 12/2002 | Brown et al. | 709/220 |

* cited by examiner

*Primary Examiner*—Tim Vo
*Assistant Examiner*—Trisha Vu
(74) *Attorney, Agent, or Firm*—Marger Johnson & McCollom, PC

(57) ABSTRACT

An interface controller includes configuration circuitry generated based on a configuration package associated with endpoint configuration parameters. The configuration circuitry is used for configuring logic circuitry in the interface controller for different endpoint configurations.

28 Claims, 8 Drawing Sheets

CONFIGURABLE USB INTERFACE WITH VIRTUAL REGISTER ARCHITECTURE

BACKGROUND

A Universal Serial Bus (USB) device refers to a scanner, printer, facsimile (Fax), Compact Disk (CD) drive, or any other peripheral device, that communicates with a host over a USB interface. In one configuration, the host is some sort of computer system that communicates to the USB device through a USB interface controller. The USB interface controller contains a collection of configuration values, interfaces (potentially with alternate interface settings), and endpoint parameters that may change for different USB devices. In one embodiment, these configuration values for a particular USB device are hard coded into the USB interface controller.

Because the endpoint configurations are hard coded, the USB device cannot reconfigure the USB interface controller (using software or other means) for different endpoint configurations. This means that different versions of the USB interface controller have to be fabricated for different endpoint configurations in the USB devices. This requires writing and maintaining different Hardware Description Language (HDL) code for each different version of the USB interface controller.

One method used for configuring the USB device uses a script. The script asks a designer a series of questions and then outputs a piece of HDL code that is incorporated into base HDL code. This approach is clumsy, error-prone, and produces HDL code that is difficult to debug and maintain.

The present invention addresses this and other problems associated with the prior art.

SUMMARY OF THE INVENTION

An interface controller includes configuration circuitry generated from a configuration package associated with endpoint configuration parameters. The configuration circuitry is used for configuring logic circuitry in the interface controller for different endpoint configurations.

The foregoing and other objects, features and advantages of the invention will become more readily apparent from the following detailed description of a preferred embodiment of the invention which proceeds with reference to the accompanying drawings.

DETAILED DESCRIPTION

Figure 1:
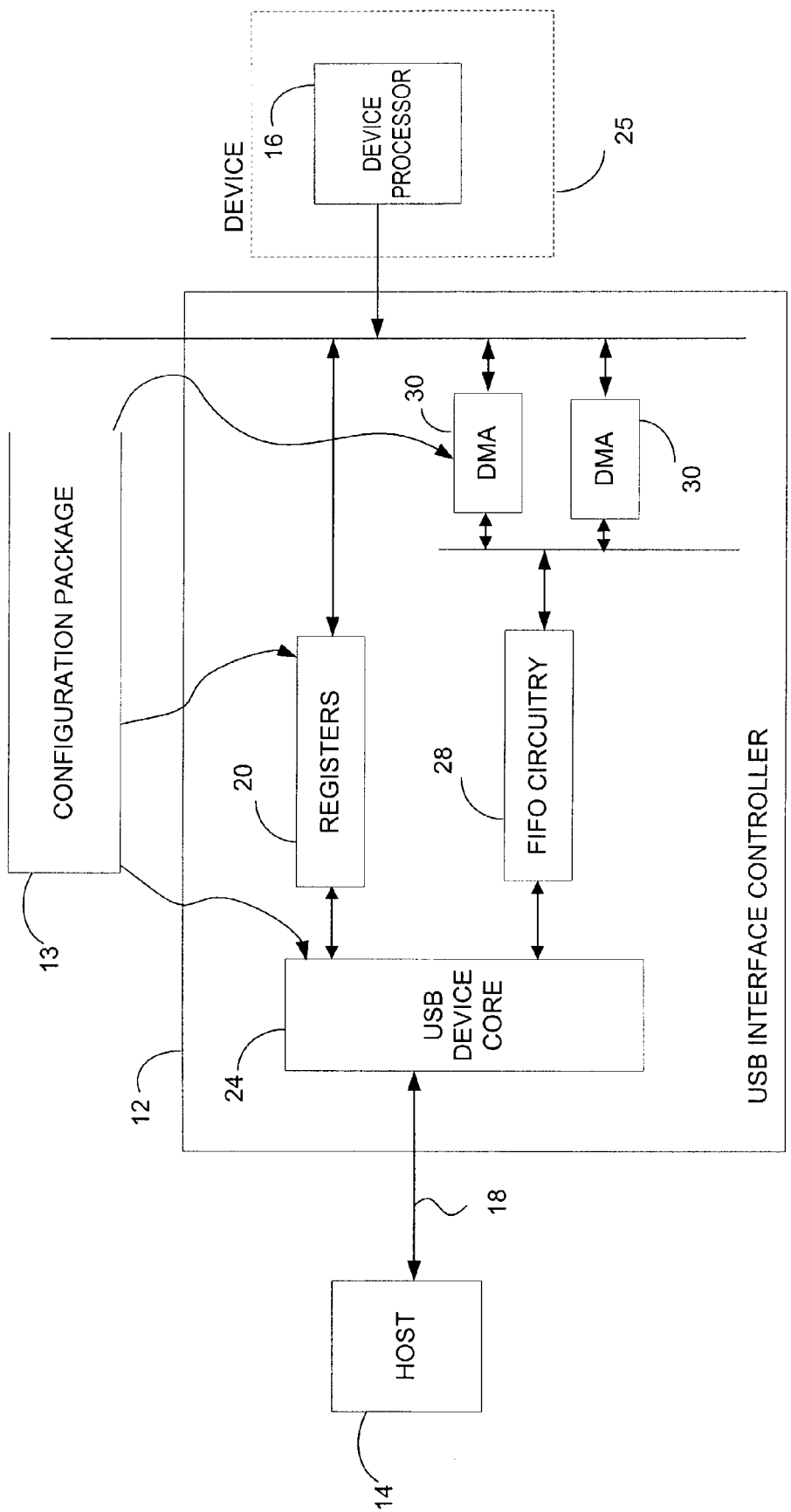
FIG. 1 is a block diagram of an USB interface controller.

FIG. 1 shows a USB interface controller 12 that includes a USB device core 24 that communicates with a host 14 over a USB interface 18. The USB device core 24 is known to those skilled in the art, and is therefore not described in further detail. The interface controller 12 includes different registers 20 for storing configuration parameters and other data. First-In First-Out (FIFO) circuitry 28 is used for buffering data while being transferred between the host 14 and a USB device 25. One or more Direct Memory Access (DMA) interface controllers 12 control data transfers between one or more USB endpoints 25 and the interface controller 12. There may be one or more data sources or sinks in the same USB device 25. For example, the USB device 25 may be a combination facsimile (FAX), copier, and printer where each function comprises one or more different data sources or sinks. In other situations, the device 25 may have only one associated data source or sink. These data sources or sinks in the USB device typically have a one-to-one relationship with USB endpoints.

A configuration package 13 contains values used to describe the multiple endpoints defined for a particular USB device. The configuration package 13 configures the different functional elements 24, 26, 28 and 30 in the USB interface controller 12 for N different physical endpoints (channels). The configuration package 13 is represented as one block in FIG. 1, but may be one or multiple different files. Instead of prefabricating a particular endpoint configuration in silicon, the configuration package 13 is used at Hardware Description Language (HDL) compile time to generate multiple configuration registers that are each writeable and readable and allow the USB interface controller 12 to be configured on-the-fly for multiple different USB endpoint configurations.

One example below shows how endpoints are defined in the configuration package 13. Configuration parameters in the configuration package can be as simple as the number of physical endpoints to be supported; other information may also be included. The information may be encoded in the configuration package 13 as follows:

```
constant NUM_EP       :integer := 30;   --total number of physical endpoints
constant NUM_ISOC_EP  :integer := 10;   --number of endpoints with isoch support
constant NUM_ADDR     :integer := 28;   --number of bits needed for FIFO size
```

HDL code uses the values from the configuration package 13 to generate the logic necessary to identify the endpoints to the other logic blocks in the interface controller 12, as well as keep track of the current status of each defined endpoint.

Figure 2:
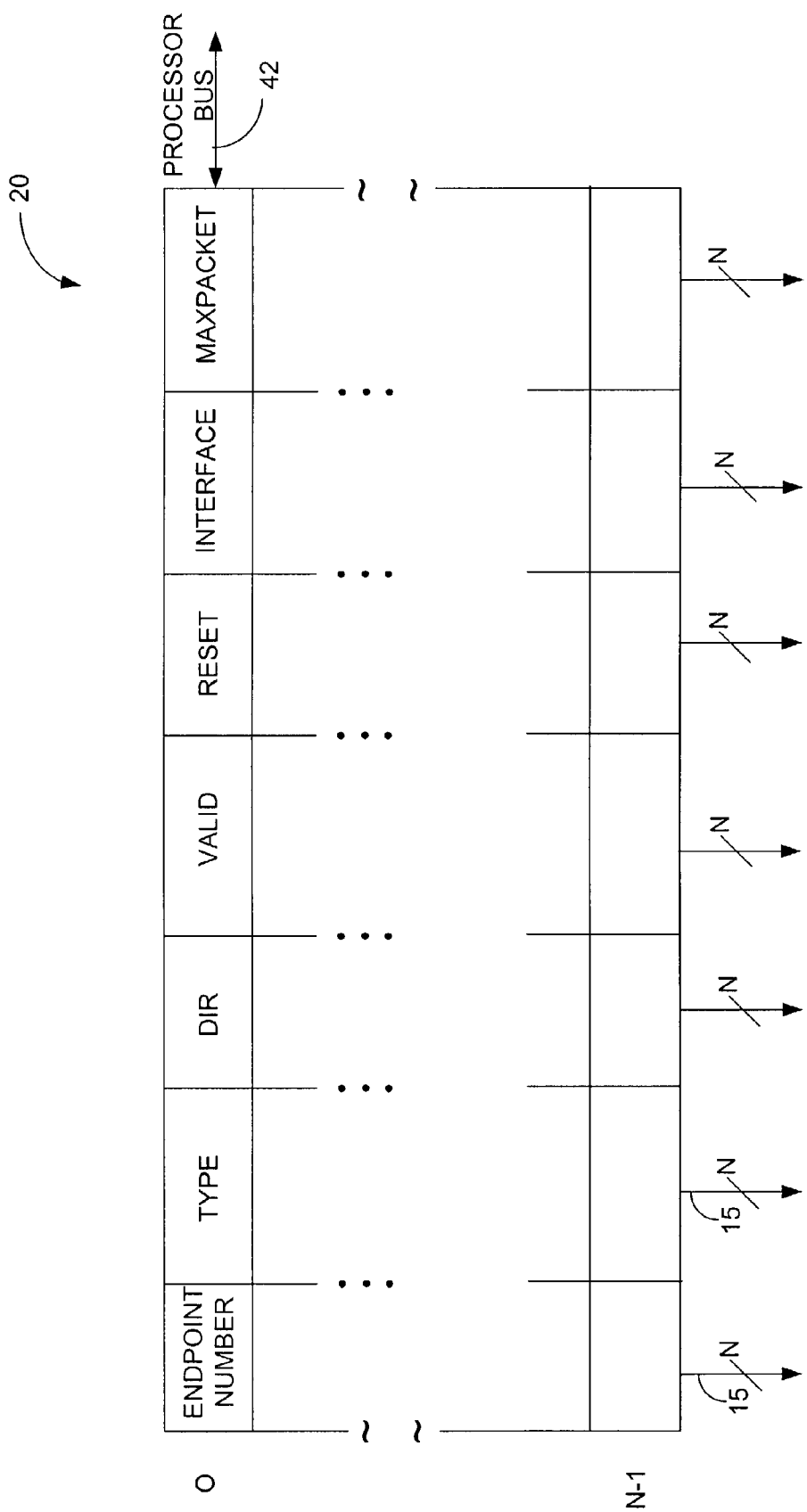
FIG. 2 is a diagram of configuration registers generated from a configuration package shown in FIG. 1.

In one implementation, the registers are produced using Very Large Scale Integration Hardware Description Language (VHDL) generate statements (or some equivalent mechanism) to create an array of configuration registers 20 shown in FIG. 2. This array of registers can be initialized during reset to a desired default state by an attached processor. The register array can also be initialized by a clocked process using hard-coded values from combinatorial logic, by a clocked process using values stored in ROM, or by some other means.

The portion of generalized VHDL code below shows one example of how the configuration registers (in particular, the output stages) are may be generated from the configuration package 13.

```
generate_outputs: process(PCLK)
begin
    if (PCLK'event and PCLK='1') then
        for i in NumEP downto 1 loop
            ENDPT_TYPE(i)<=endptConfig_sig(i)(5 downto 4);
            ENDPT_NUM(i)<=endptConfig_sig(i)(3 downto 0);
            ENDPT_DIR(i)<=endptConfig_sig(i)(6);
            ENDPT_VALID(i)<=endptConfig_sig(i)(7);
            PKT_COUNTi(i)<=endptCntl_sig(i)(3 downto 0);
            PKT_FRAME(i)<=endptConfig_sig(i)(30 downto 29);
            FS_MAX(i)<=endptConfig_sig(i)(17 downto 8);
            HS_MAX(i)<=endptConfig_sig(i)(28 downto 18);
            STALL(i)<=endptCntl_sig(i)(4);
            START_ADDR(i)<=start_sig(i);
        end loop;
    end if;
end process;
```

FIG. 2 shows the configuration registers 20 generated from the HDL code described above. An output bus 15 contains values from the configuration registers 20 indexed by physical endpoint ("channel") number. In this example, N (which corresponds to NUM_EP in the example code fragment above) different configuration registers 20 are generated when the generalized HDL code and configuration package 13 are compiled using an HDL compiler. Each of the configuration registers 20 may include any of the following fields: logical endpoint number, type, direction, valid, reset, interface and maximum packet size. Of course, the configuration package 13 can be set up to generate any different number or different type of fields needed by the device logic circuitry.

The configuration registers 20 are produced for each supportable endpoint in the USB interface controller 12. These sets of registers 20 allow a processor 16 in the USB device 25 (FIG. 1) to dynamically configure the endpoints for any particular application. In one embodiment, the configuration registers 20 contain fields for all parameters needed to describe the characteristics of the endpoint. In other embodiments, some endpoint parameters may exist in the configuration registers, while other parameters may be supplied directly by hard-coded combinational logic.

The fields in the configuration registers 20 are associated with particular USB endpoint parameters. However, the registers 20 can be generated for endpoints or parameters, other than those associated with the USB protocol. The fields, the number of bits in each field, and the parameter values could be changed for that particular protocol. For example, the fields in configuration register 20 could be associated with devices using a Peripheral Component Interconnect (PCI) or Advanced Technology Attachment (ATA) bus protocol, to name a few.

Figure 3:
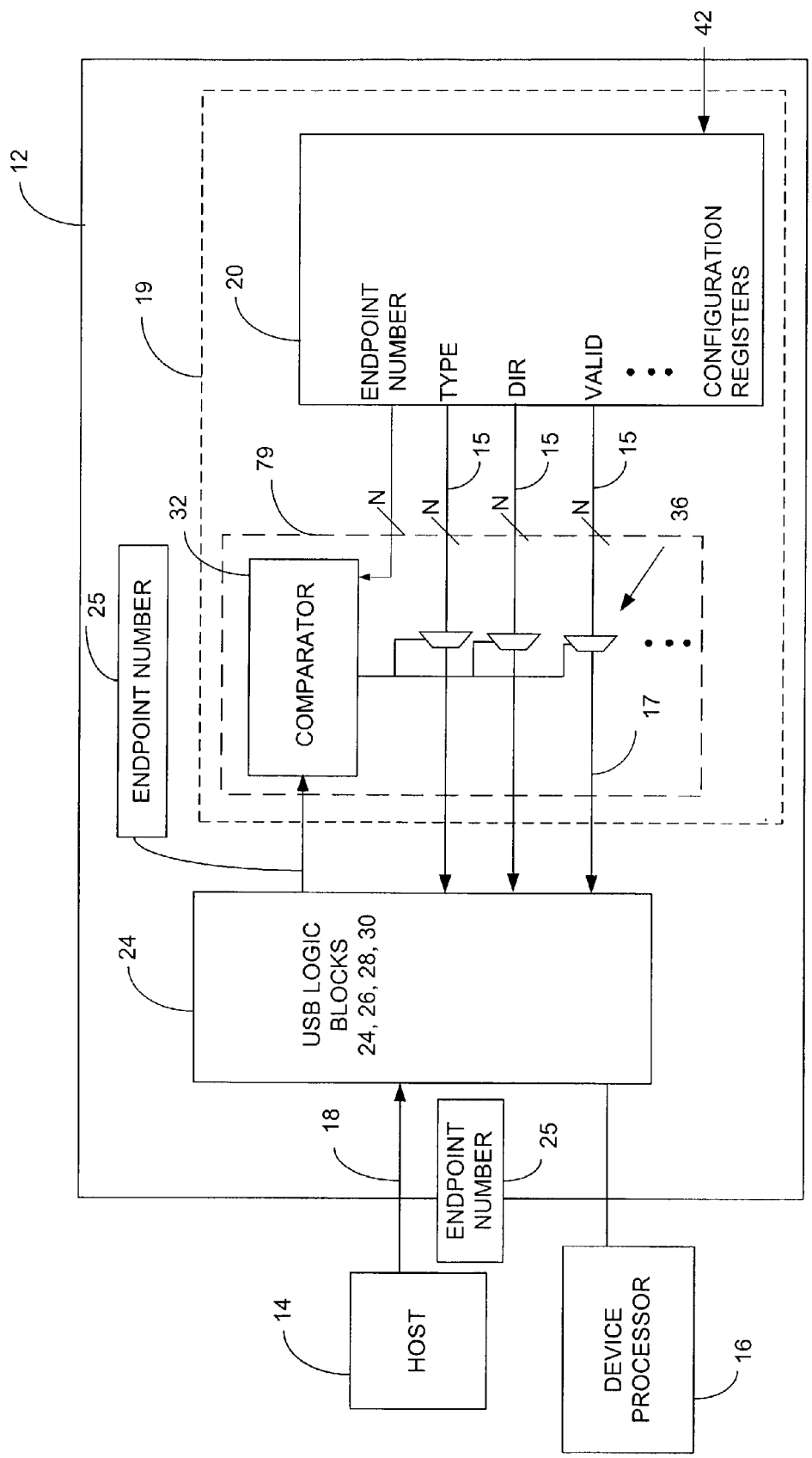
FIG. 3 is a block diagram of a configuration circuit using the configuration registers shown in FIG. 2.

FIG. 3 shows a configuration circuit 19 that includes a comparator 32, multiplexers 36, and the configuration registers 20. The configuration circuit 19 provides on-the-fly configuration for the USB interface controller 12. An endpoint number 25 is contained in a USB packet sent by the host computer 14 to the USB interface controller 12 over USB interface 18. The USB device core 24 sends the USB endpoint number 25 to the comparator 32. The comparator 32 tries to match the endpoint number 25 with one of the endpoint numbers 40 contained in the configuration registers 20. If there is a match, selection circuitry 79 comprising the comparator 32 and multiplexers 36 select the configuration parameters on the configuration bus 15 corresponding with the matching endpoint number. The selected configuration parameters 17 are then used by the different functional blocks 24, 26, 28 and 30 in the USB interface controller 12.

The configuration registers 20 and selection logic 79, which is comprised of a comparator and multiplexors, are automatically generated at hardware design compile time based on the configuration package 13. This means the only decision that must be made by the system designer is the maximum number of physical endpoints to instantiate. All other configuration decisions are left to other intelligence in the system.

A port 42 provides a way that the processor 16 in the USB device 25 can read and write the configuration registers 20. Rather than handling USB Set_Configuration and Set_Interface requests internally, the USB interface controller 12 provides external notification of such a request and holds off completion of the request until allowed to proceed by the external processor 16. This allows the external processor 16 a chance to modify the contents of the configuration registers 20 based on system conditions.

Figure 4:
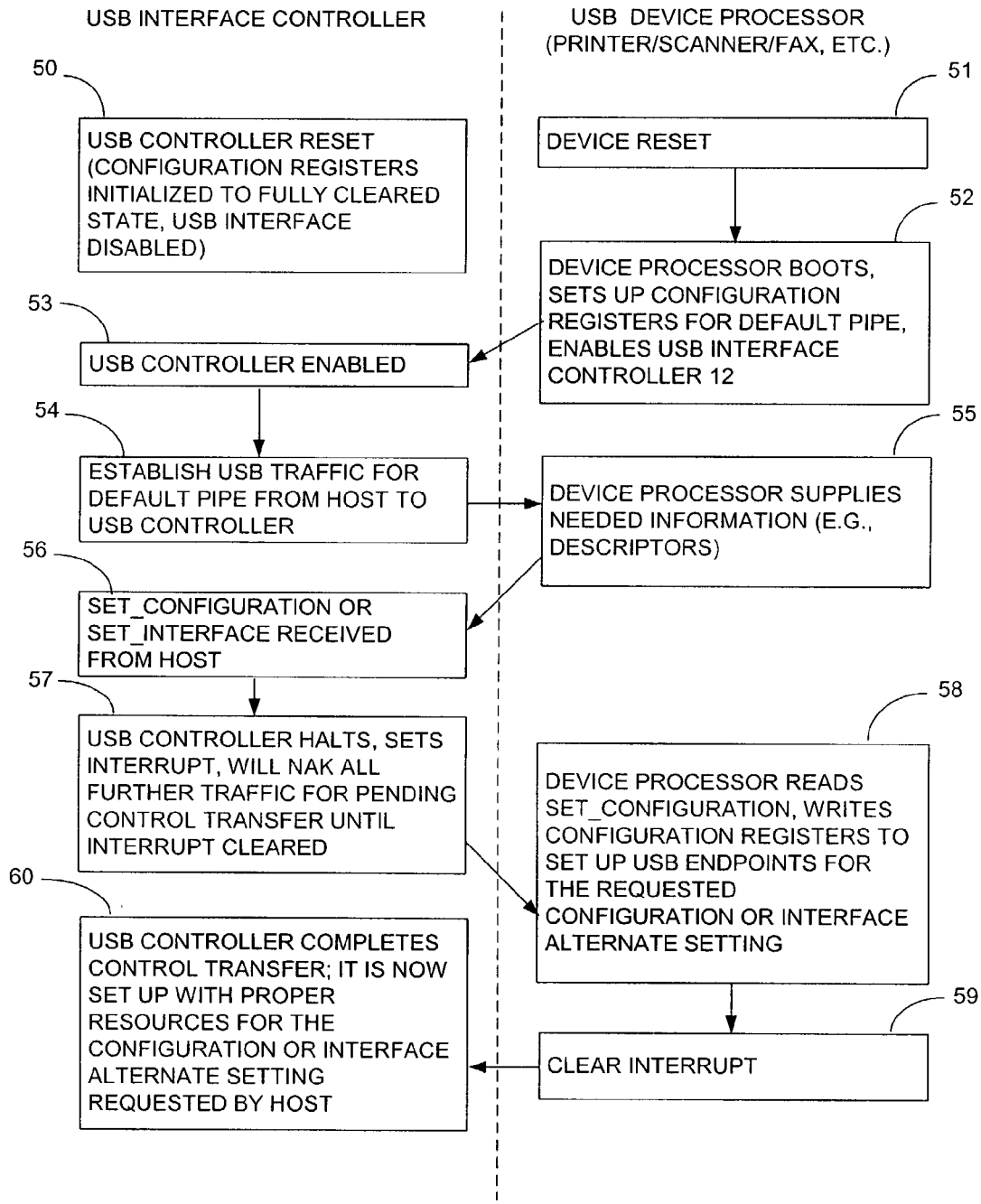
FIG. 4 a flow diagram showing how the configuration circuit in FIG. 3 is setup.

FIG. 4 explains how the USB interface controller 12 operates in conjunction with the configuration registers 20 shown in FIGS. 2 and 3. In blocks 50 and 51, the USB interface controller 12 and the USB device 25 (FIG. 1) are both reset. In one embodiment, the configuration registers 20 are initialized to a fully cleared state and the USB controller 12 is disabled.

At block 52, the processor 16 in USB device 25 boots up and then sets up the configuration registers 20 in the USB controller 12 to establish a default pipe with the host 14. At block 53, the USB controller 12 is enabled and at block 54 USB traffic commences over the default pipe between the host and the USB controller 12. The device processor 16 at block 55 supplies descriptors to the host 14 identifying the type of USB device.

At block 56, after the host 14 and the device processor 16 have exchanged information, the host 14 sends a USB Set_Configuration or Set_Interface request. The descriptors sent by the device processor 16 may have identified multiple different endpoint configurations to the host 14. For example, one endpoint configuration may be for a printer, another endpoint configuration may be for a scanner, and a third endpoint configuration may be for a device that operates as both a printer and a scanner. The Set_Configuration request sent by the host in block 56 identifies which of the identified configurations the host 14 wants to enable.

Until this point, only the default pipe has been set up. At block 57, the USB interface controller 12 stops and sets an interrupt telling the device processor 16 that it needs to respond to the Set_Configuration request from the host 14. The USB interface controller 12 holds off completing control transfer associated with the Set_Configuration request until the interrupt is cleared by the device processor 16.

At block 58, the device processor 16 determines what configuration is requested by the host 14. The device processor 16 then writes the configuration values for the configuration identified in the Set_Configuration request into the configuration registers 20. For example, for a printer device, there may be a bulk-in pipe at a first endpoint number, a bulk-out pipe at a second endpoint number and an interrupt pipe at a third endpoint number, all of which are valid for the same interface number.

The device processor 16 writes the configuration values for each endpoint into a separate one of the configuration registers 20. The device processor 16 may do the same thing for a scanner interface that is also associated with the same USB device. There could then be several configuration registers loaded with configuration values by the device processor 16. One or two configuration registers may be loaded for the initial default pipe, and another three or so configuration registers loaded for the printer and scanner interfaces.

The device processor 16 clears the interrupt in block 59. The USB interface controller at block 60 completes the control transfer with the host 14 by completing the status stage of the transfer. The USB interface controller 12 is now set up for the proper configuration requested by the host.

The configuration package 13 (FIG. 1) allows flexibility for the system designer. Any physical endpoint may be associated with any allowable logical endpoint number. Any physical endpoint may be of any type allowed by USB, and have any characteristics allowed by the USB specification or any other protocol. Further, the USB interface configuration may be changed on-the-fly to any other configuration allowed by the USB specification.

The configuration registers 20 allow software to control the endpoint information. Software can control things like endpoint toggles and HALT status when necessary on relatively infrequent occasions, without the overhead of being required to control them for ordinary traffic. It allows software control over USB configuration at run time, within the constraints specified by the configuration package 13. This gives firmware flexibility over the USB configuration, so a design can even provide hardware support for a specification that hasn't been written at the time the hardware is designed. That is, the hardware could include "best guess plus a little" hardware configuration, and leave the details up to the software.

Combinational Logic Configuration Circuit

Non-processor based USB devices may not have the ability to load registers on—the—fly with configuration values. This means that configuration values for a particular USB endpoint may have to be hardcoded into the USB interface controller. This would typically require different versions of the USB interface controller to be fabricated for each different USB endpoint. This presents a problem creating and maintaining different sets of HDL code for each different version of the USB controller.

Another embodiment of the configuration circuitry of this invention generates different selectable USB endpoint configuration arrays for operation with non-processor based USB devices. The configuration arrays are generated using a block of combinational logic and in conjunction with the same configuration bus architecture previously described. This allows much of the same HDL code to be used for both processor and non-processor based USB interface controllers.

Figure 5:
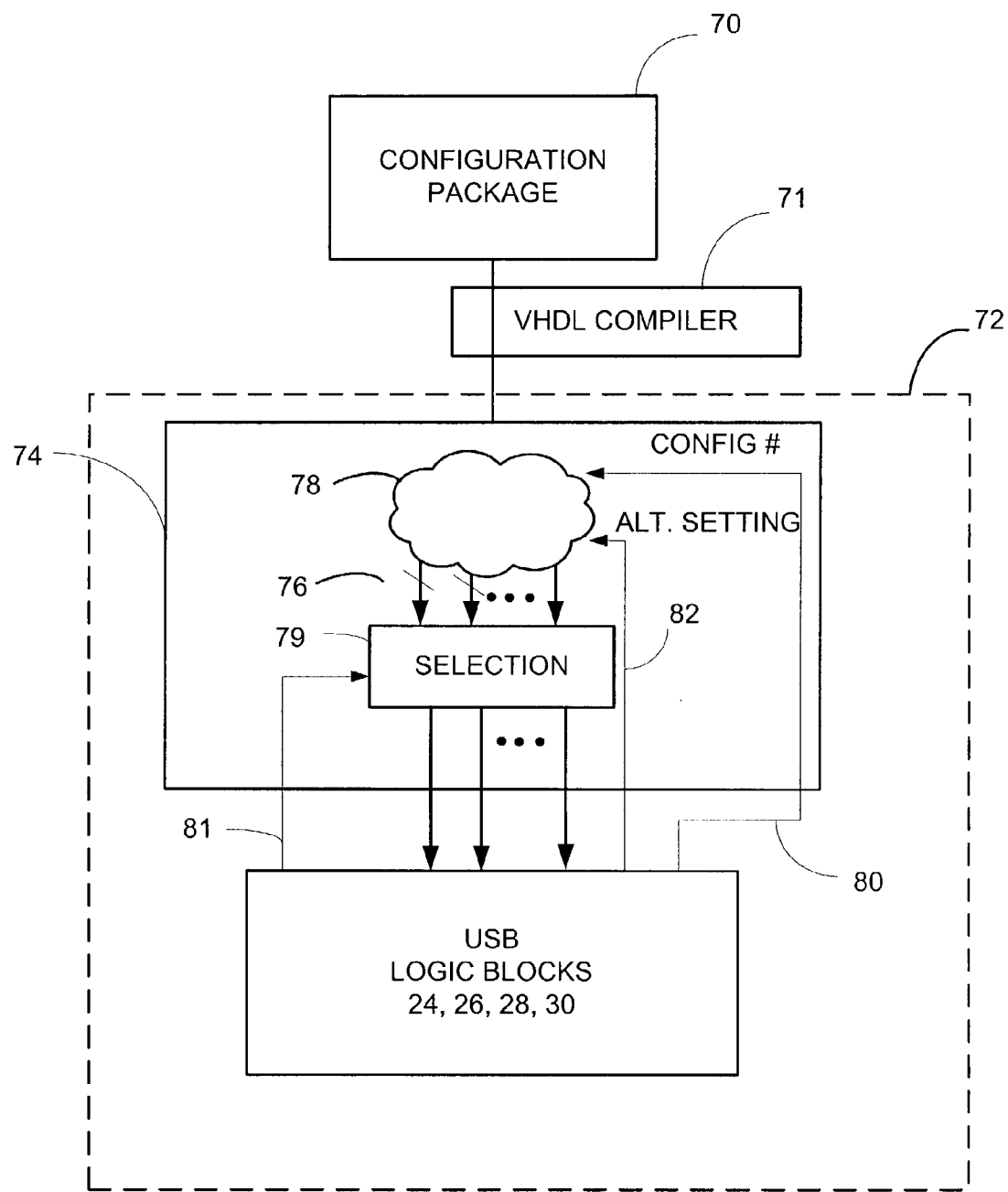
FIG. 5 is a block diagram of a configuration circuit that uses combinational logic.

FIG. 5 shows a HDL configuration package 70 that describes different USB configurations, interfaces and endpoints. The configuration package 70 also includes the configuration values for those endpoints.

One example below shows how endpoints are defined in the configuration package 70. Configuration parameters in the configuration package may include any variety of parameters including interface, alternate setting, endpoint number, endpoint direction, endpoint type, maximum packet size for full speed, maximum packet size for high speed, and number of transactions per microframe. The information is encoded in the configuration package 13 as follows:

| | |
|---|---|
| configuration number | :integer range 1 to 155 |
| interface number | :integer range 0 to 255 |
| alternate interface number | :integer range 0 to 255 |
| endpoint number | :integer range 1 to 15 |
| endpoint direction | :OUTPUT\|INPUT |
| endpoint type | :CONTROL\|ISOCHRONOUS\|BULK\|INTERRUPT |
| full speed max packet size | :integer range 0 to 1023 |
| high speed max packet size | :integer range 0 to 1024 |
| transactions per microframe | :integer range 0 to 3 |

This information is input as a record in the following format:

(configuration number, interface number, alternate interface number, endpoint number, endpoint direction, endpoint type, FS max packet size, HS max packet size, transactions per microframe).

For example, a configuration package entry that would specify a bulk out endpoint with a full speed maximum packet size of 64, high speed maximum packet size of 512, and address endpoint number 10, that exists in alternate setting 2 of interface 1 of configuration 12 would be coded as follows:.

(12, 1, 2, 10, OUTPUT, BULK, 64, 512, 0)

This HDL configuration package 70 is compiled by an HDL compiler 71 along with some generalized HDL code to produce combinational logic 78 in configuration circuit 74 that operates essentially as multiple different virtual registers that include the configuration values for different USB endpoints.

The HDL code below shows one example of generalized HDL code which is used to produce the specific combinational logic 74 from the configuration package 70.

```
info_map: process (hs_mode, config, soft_reset, alt_int)
   variable index : integer;
   variable found : integer;
   variable ep_num: NDEP_Array_4;
begin
   index :=1;
   sft_reset(0)<='0';
   for i in 1 to NUM_EP loop
      endpt_valid(i)<='0';
      sft_reset(i)<='0';
      endpt_dir(i)<='0';
      endpt_int(i)<=(others =>'0');
      endpt_type(i)<=(others =>'0');
      max_pkt(i)<=(others =>'0');
      ep_num(i):=(others=>'0');
   end loop;
```

```
for i in 0 to (config_info'length-1) loop
    if    (conv_integer(config)=config_info(i)(P_CON-
      FIG)) then
      found :=0;
      for j in 1 to NUM_EP loop
        if    (config_info(i)(P_EP)=conv_integer(ep_
          numj))) then
          found :=j;
          exit;
        end if;
      end loop;
      if (found=0) then
        found:=index;
        ep_num(found):=conv_std_logic_vector
          (config_info(i)(P_EP), 4);
      end if;
      if (config_info(i)(P_ALT_INT)=
        conv_integer(alt_int(config_info(i)
          (P_INTERFACE)))) then
        endpt_type(found)<=conv_std    logic_vector
          (config_info(i)(P_EP_TYPE), 2);
        endpt_valid(found)<='1';
        endpt_int(found)<=conv_std    logic_vector
          (config_info(i)(P_INTERFACE), 8);
        sft_reset(found)<=soft_reset(config_info(i)
          (P_INTERFACE));
        if (hs_mode='1') then
          max_pkt(found)<=conv_std_logic_vector
            (config_info(i)(P_EP_MAX_HS), 11);
        else
          max_pkt(found)<=conv_std_logic_vector
            (config_info(i)(P_EP_MAX_FS), 11);
        end if;
        if (config_info(i)(P_EP_DIR)=INPUT) then
          endpt_dir(found)<='1';
        else
          endpt_dir(found)<='0';
        end if;
      end if;
      if (found=index) then
        index :=index+1;
      end if;
    end if;
end loop;
max_pkt(0)<=conv_std_logic_vector(maxpacket( ),
  11);
endpt_num<=ep_num;
  end process;
```

By hardcoding the configuration values into combinational logic 78, the USB interface controller 72 can be configured for different endpoints without relying upon a processor in the USB device to load configuration values into configuration registers.

The combinational logic 78 in configuration circuit 74 receives a currently set configuration number 80 and a currently set alternate settings value 82 from the USB device core 24. Based on these received inputs, the combinational logic 78 generates different endpoint configuration values that are output on a configuration bus 76. Selection circuitry 79 is used to output the configuration values for an identified endpoint value 81. The endpoint configuration values configure the functional elements 24, 26, 28 and 30 in the USB interface controller 72.

Figure 6:
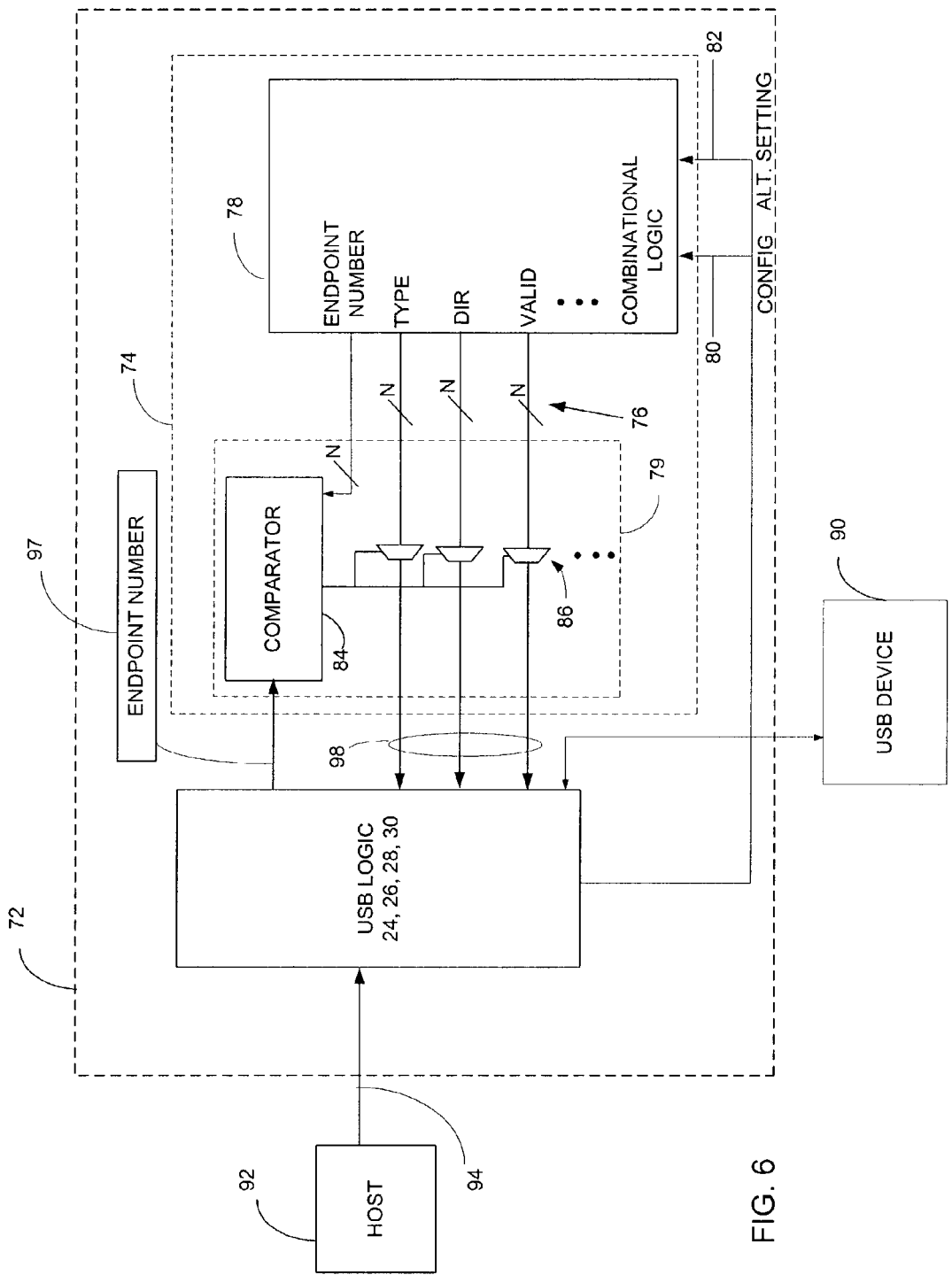
FIG. 6 is a block diagram of an USB interface controller that uses the configuration circuit shown in FIG. 5.

FIG. 6 shows in more detail the configuration circuit 74 shown in FIG. 5. The USB interface controller 72 is coupled to a host 92 and a USB device 90. In one example, the host 92 may be a computer and the endpoint USB device 90 may be any device that needs to communicate with the host 92 over a USB bus 94. For example, the device 90 may be a printer or scanner. The USB interface controller 72 receives an endpoint number in a request from the host 92.

The USB interface controller 72 receives an endpoint number in a request from the host 92. The endpoint number 97 is sent to a comparator 84 in selection circuitry 79. If the comparator 84 identifies a matching endpoint in the outputs of combinational logic 78, the configuration values on configuration bus 76 associated with the matching endpoint are output from multiplexer circuitry 86 on configuration lines 98. The configuration values on configuration lines 98 are supplied to any of the USB logic 24, 26, 28 or 30.

Figure 7:
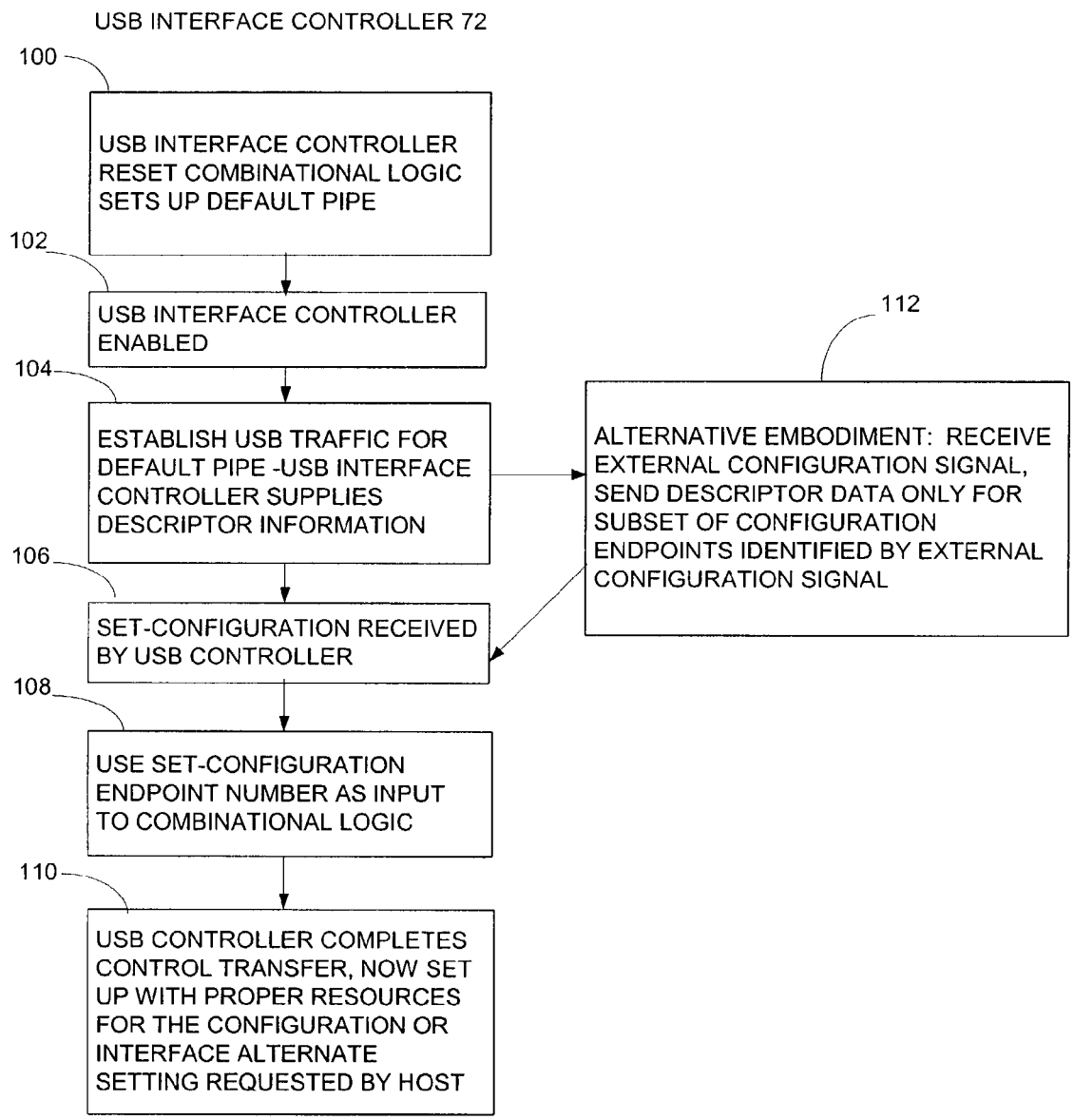
FIG. 7 is a flow diagram showing how the configuration circuit in FIG. 5 is setup.

FIG. 7 shows how the USB interface controller 72 in FIG. 6 is initialized during a reset. At block 100 the USB interface controller 72 is reset and the combinational logic 78 in FIG. 6 is used to set up a default pipe with the host 92. The USB interface controller 72 is enabled for communicating with the host in block 102. At block 104, USB traffic is established between the host 92 and the USB interface controller 72 over the default pipe. The USB interface controller 72 supplies descriptor information to the host 92. At block 106, a $Set_{13}$ Configuration request is received by the interface controller 72 from the host 92.

In a processor-based USB device, a processor in the USB device 90 in FIG. 6 would use the Set_Configuration request from the host 92 to load configuration values into the configuration registers 20 shown in FIG. 3. However, the device 90 may not have a processor.

The value set by the Set_Configuration request 96 from the host 92 is used to identify hardcoded endpoint configuration parameters in combinational logic 78. Alternate settings 82 requested by the host can also be sent to the combinational logic 78. The USB interface controller 72 is now set up with the proper endpoint configuration. An endpoint number 97 obtained from USB traffic from the host 92 is then used by comparator 84 to select the proper configuration parameters for that endpoint onto configuration lines 98, which are then supplied to any of the USB logic 24, 26, 28 or 30. At block 110, the USB interface controller 72 completes the control transfer with the host 92.

Figure 8:
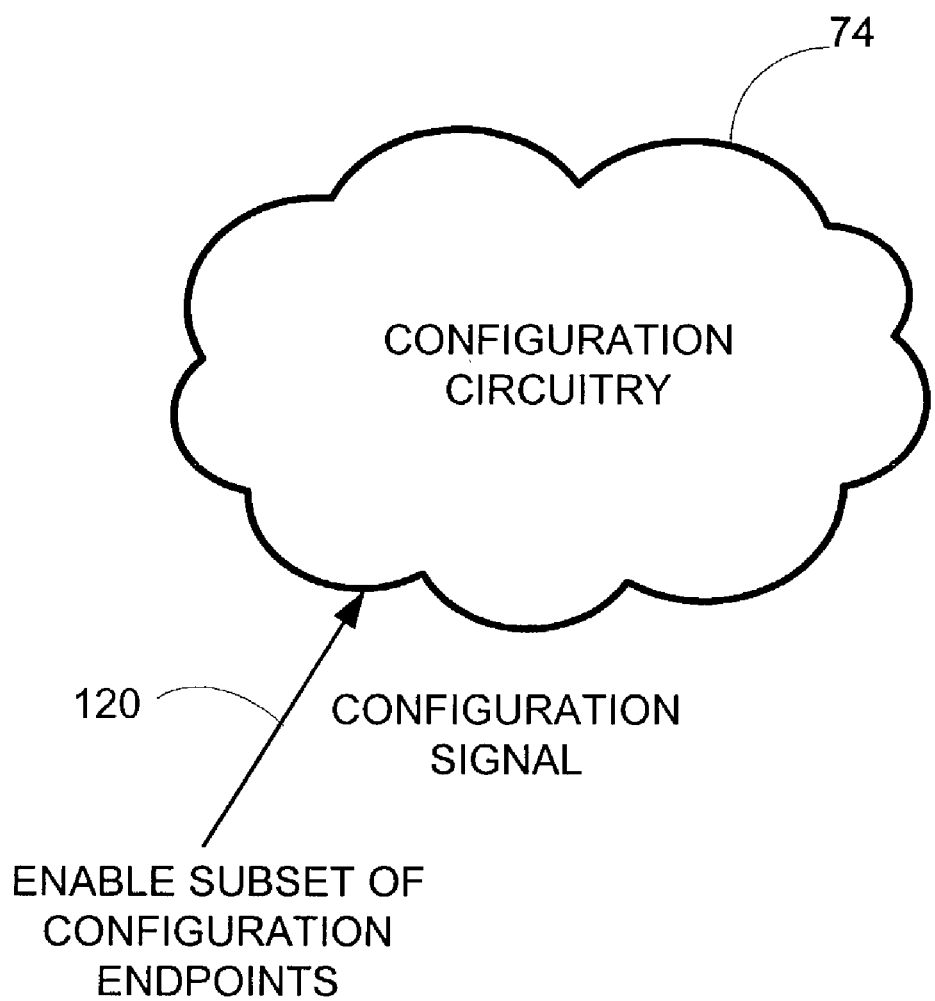
FIG. 8 is a diagram showing how a subset of the parameters in the configuration circuit shown in FIG. 5 are selected.

FIG. 8 shows an alternative embodiment where an additional configuration signal 82 is used for identifying a subset of the hardcoded configuration endpoint parameters contained in the combinational logic 74 in FIG. 6.

The USB interface controller 72 reads the configuration signal 120, and then referring to block 112 in FIG. 7, the USB interface controller 72 sends back descriptor information to the host 92 only for the subset of potentially supported endpoints associated with the configuration signal 120. This allows the same USB interface controller 72 to be used for a wider variety of USB devices. The configuration signal 120 may be generated by a switch or other hardware on the USB device or alternatively generated by software on the USB device or other circuitry.

In one example, the configuration signal 120 allows the same version of the USB interface controller 72 to be used for a combination scanner/printer/fax device or for any individual scanner, printer or fax device. The combinational logic 74 can be hardcoded with configuration parameters for a combination scanner/printer/fax USB device and for separate printer, scanner, and fax interfaces.

The configuration signal 120 causes the USB interface controller 72 to only send back descriptor data for the correct device USB endpoint. For example, the USB device may be a printer, but the interface controller 72 may have hardcoded configuration parameters for a printer, scanner and fax USB interfaces. The configuration signal 120 causes the interface controller 72 configuration circuitry 74 to only send back to the host 92 the descriptor data for the printer interface. Alternatively, if the USB device provides all three scanner/printer/fax functions, then the configuration signal 120 is disabled and the USB interface controller 72 is free to identify all three endpoint configurations to the host 92.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

What is claimed is:

1. An interface controller, comprising:
    configuration circuitry generated from at least one configuration package associated with configuration parameters for different endpoints, the configuration package used for configuring different functional elements in the configuration circuitry during hardware description language (HDL) compiling to operate with different endpoint characteristics or structures, and the configuration circuitry then used for configuring the interface controller for the different endpoint characteristics or structures.

2. The interface according to claim 1 wherein the configuration circuitry is varied during HDL compiling for different endpoints by changing the configuration package.

3. The interface controller according to claim 2 including a generic set of hardware description language code that relies on the configuration package to generate the different configuration circuitry for the different endpoint characteristics or structures.

4. The interface controller according to claim 1 wherein the configuration circuitry includes a set of configuration registers for retaining the configuration parameters for the different endpoints.

5. The interface controller according to claim 1 wherein the configuration circuitry includes hardcoded combinational logic that embodies the configuration parameters.

6. The interface controller according to claim 1 wherein the configuration circuitry includes a bus that selectively outputs the configuration parameters for the different endpoints.

7. The interface controller according to claim 1 including an input signal for selecting the configuration parameters for a subset of the different endpoints.

8. The interface controller according to claim 1 wherein the configuration circuitry selects configuration parameters for the different endpoints according to a received endpoint number received from a Universal Serial Bus (USB) host.

9. The interface controller according to claim 8 wherein the configuration circuitry is configurable on-the-fly by a USB device that provides endpoint descriptors to the configuration circuitry that correspond with the endpoint number received from the USB host.

10. A method for configuring an interface controller, comprising:
    receiving a configuration request from a host requesting particular structure and characteristics of one or more endpoints;
    forwarding the configuration request to a device processor coupled to the host;
    receiving configuration values back from the device processor associated with the configuration request; and
    using the selected configuration parameters to configure the interface controller.

11. The method according to claim 10 including writing the configuration parameters into configuration registers in the interface controller according to the configuration request.

12. The method according to claim 11 including:
    receiving the configuration request from a Universal Serial Bus (USB) host;
    forwarding the configuration request to a USB peripheral device processor;
    receiving the configuration parameters from the USB peripheral device processor associated with the configuration request;
    storing the configuration parameters in a USB interface controller; and
    outputting the configuration parameters to different logic elements in the USB interface controller.

13. The method according to claim 10 including:
    implementing the configuration parameters with combinational logic in the interface controller;
    selecting the configuration parameters in the combinational logic associated with the configuration request; and
    outputting the selected configuration parameters to different logic elements in the interface controller.

14. The method according to claim 10 including generating different configuration circuit logic implementing the configuration parameters for different combinations of endpoints from a hardware description language configuration package.

15. The method according to claim 14 including varying the configuration circuit for different configuration and characteristics using a substantially same set of generic hardware description language and varying endpoint values in the configuration package.

16. The method according to claim 14 including varying the configuration parameters hardcoded in the configuration circuit by varying the configuration package.

17. The method according to claim 14 including identifying a subset of configuration parameters stored in the configuration circuit according to a configuration signal.

18. A method for generating a configuration circuit, comprising:
    generating a hardware description language (HDL) configuration package that contains configuration information for a set of endpoints;
    using hardware description language (HDL) code to generate different configuration package to incorporate different endpoint parameters into the configuration circuit designs and using the HDL code to generate other configuration circuit logic configured for operating with other endpoints by making similar HDL calls to the HDL configuration package and varying the configuration information in the configuration package.

19. The method according to claim 18 including generating a set of configuration registers in the configuration circuit that can be configured with different configuration information during initialization.

20. The method according to claim 18 including generating selection logic in the configuration circuit that selects the configuration information associated with a received endpoint value.

21. A configurable Universal Serial Bus (USB) interface controller, comprising:
configuration circuitry generated from at least one configuration package containing configuration parameters for different endpoints, and the configuration circuitry used for configuring the interface controller for the different endpoint characteristics or structures; and
wherein substantially a same hardware description language (HDL) version of the interface controller is used for generating different logic and register configuration for the different endpoint characteristics or structures by varying configuration parameters in the configuration package.

22. The interface controller of claim 21, wherein the interface controller is used in a combination printer/scanner/fax USB device or an individual printer, scanner, or fax USB device without custom fabrication or custom scripting of the HDL by a designer.

23. The interface controller according to claim 21 wherein the configuration circuitry includes a set of configuration registers for retaining the configuration parameters for the different endpoints.

24. The interface controller according to claim 21 wherein the configuration circuitry includes hardcoded combinational logic that embodies the configuration parameters.

25. The interface controller according to claim 21 wherein the configuration circuitry includes a bus that selectively outputs the configuration parameters for the different endpoints.

26. The interface controller according to claim 21 including an input signal for selecting the configuration parameters for a subset of the different endpoints.

27. The interface controller according to claim 21 wherein the configuration circuitry selects configuration parameters for the different endpoints according to a received endpoint number.

28. The interface controller according to claim 21 wherein the configuration circuitry is configurable on-the-fly by a USB device during initialization.

* * * * *